July 12, 1927.
F. H. PAGE
1,635,687
MEANS FOR LATERALLY CONTROLLING AIRCRAFT
Filed Nov. 29, 1926      3 Sheets-Sheet 1
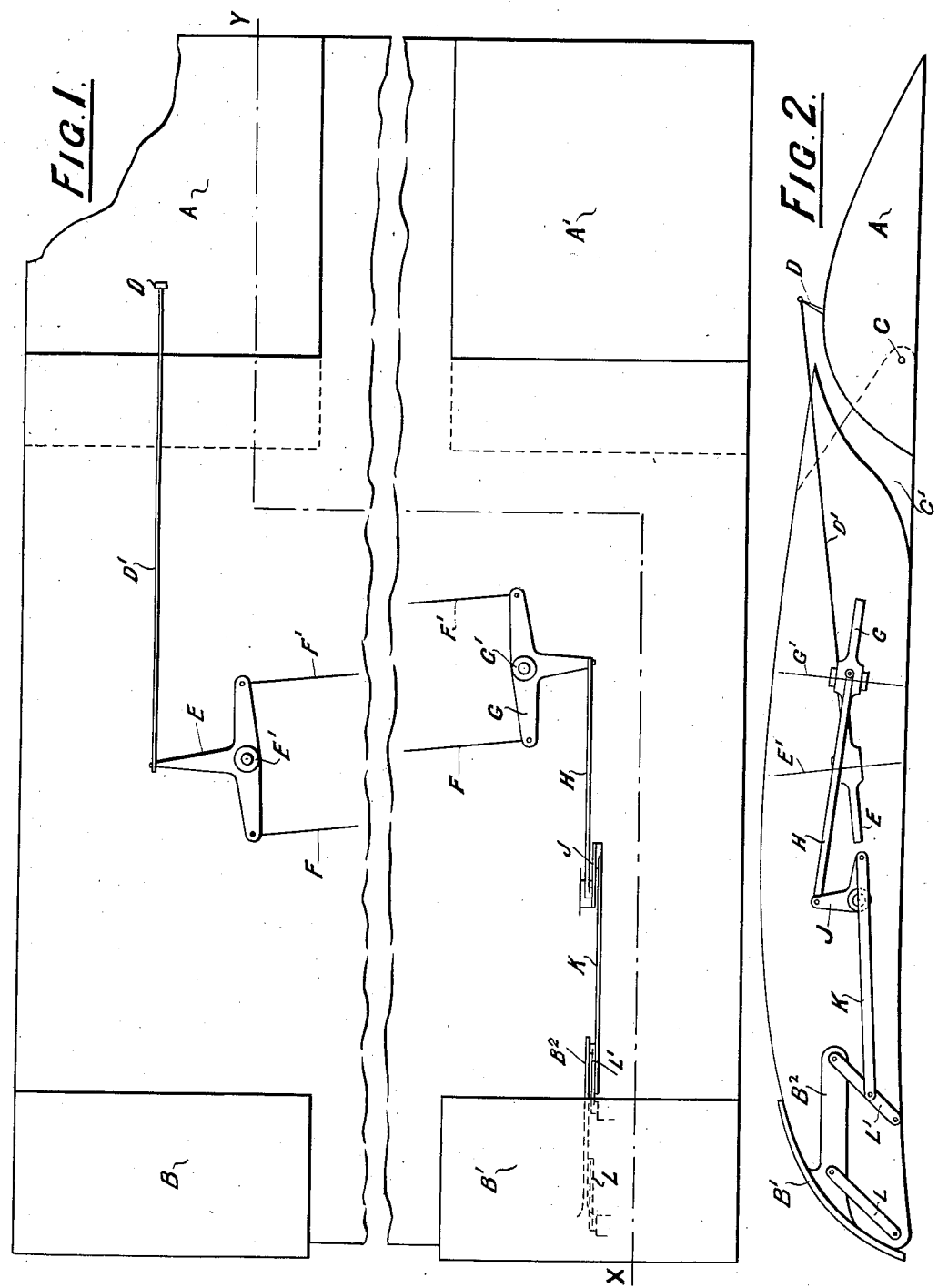

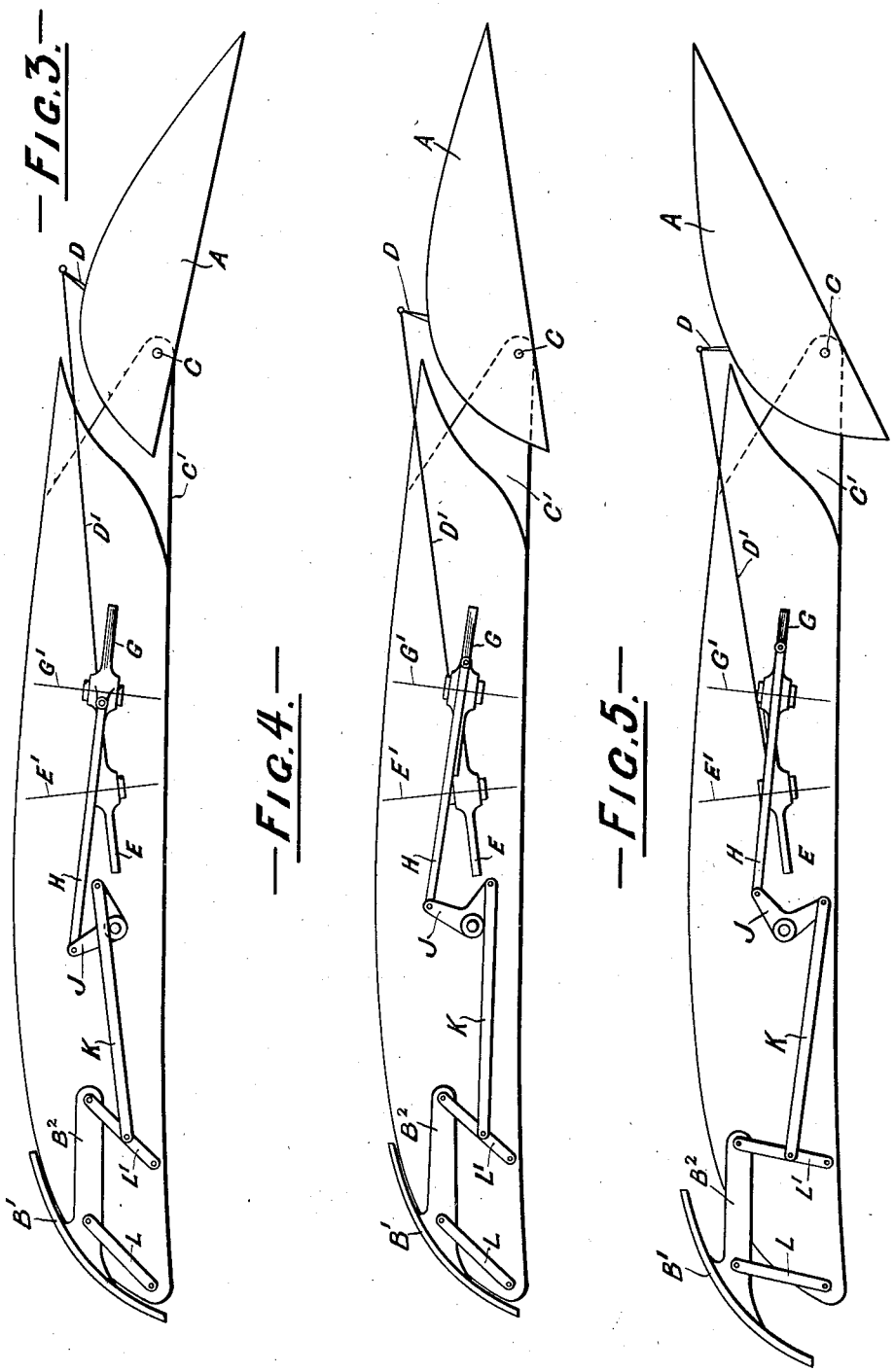

July 12, 1927.
F. H. PAGE
1,635,687
MEANS FOR LATERALLY CONTROLLING AIRCRAFT
Filed Nov. 29, 1926 3 Sheets-Sheet 3
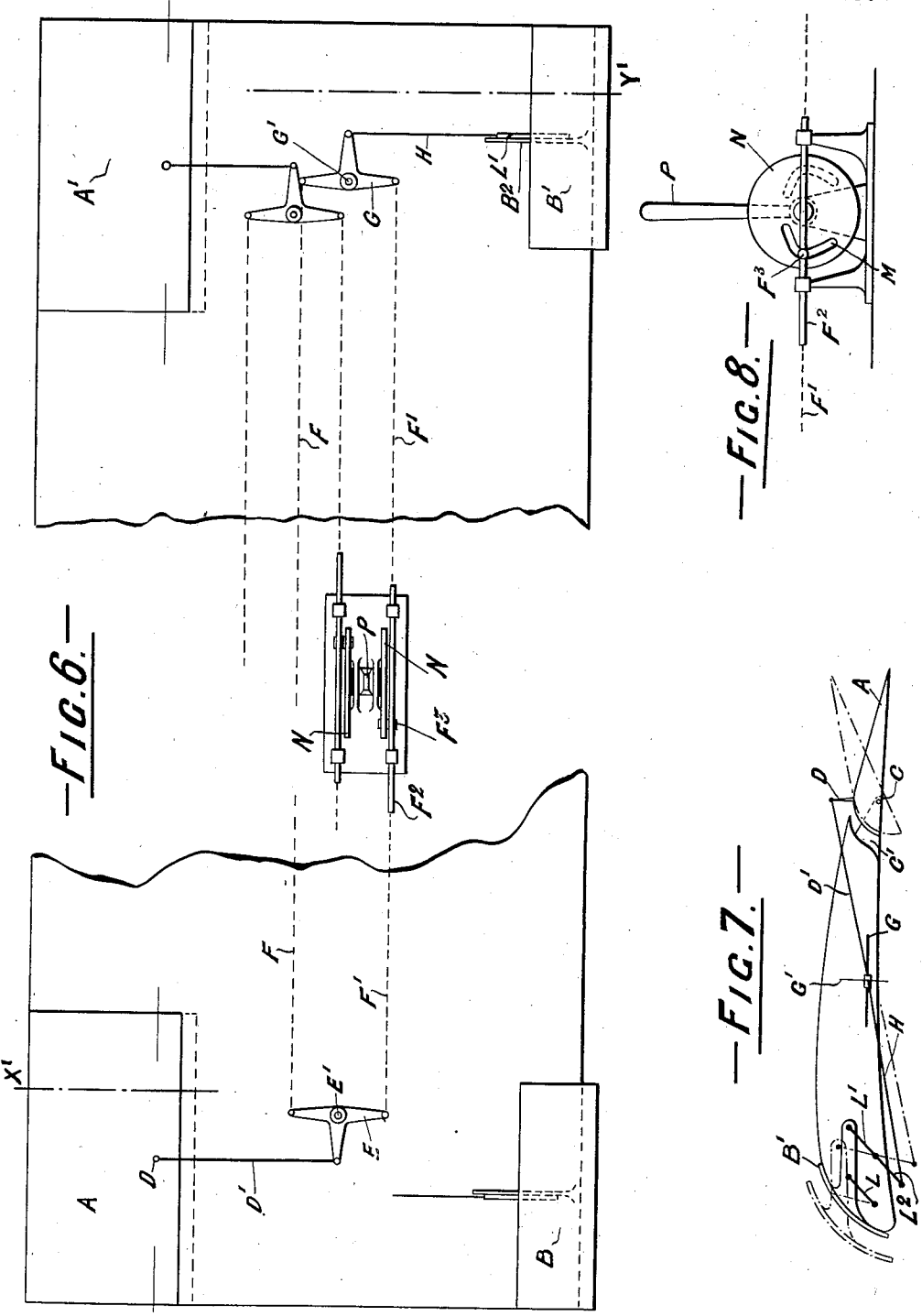
Frederick Handley Page
Inventor Patented July 12, 1927.

1,635,687

UNITED STATES PATENT OFFICE.

FREDERICK HANDLEY PAGE, OF LONDON, ENGLAND, ASSIGNOR TO HANDLEY PAGE LIMITED, OF LONDON, ENGLAND.

MEANS FOR LATERALLY CONTROLLING AIRCRAFT.

Application filed November 29, 1926, Serial No. 151,433, and in Great Britain December 9, 1925.

I have previously described in earlier specifications, means for operating auxiliary wings and vanes forwardly located in wings of aircraft, and controlled in such a way, that a slot or slots is or are opened, or controlled in extent of opening, by movements of the aileron on the wing at the rear edge thereof behind the said slot or slots.

For the lateral control of aircraft, the use of such slots so operated is particularly advantageous when the aircraft is stalled. When the aircraft is stalled the opening of the slot on one wing causes the lift on that side to be increased and the resistance to be diminished.

The more usual method of increasing the lift on one side is to lower or depress the aileron on that side. When the aircraft is stalled, the depressing of such an aileron adds little to or usually diminishes the lift, whilst it greatly increases the resistance.

It is proposed by the means now disclosed to increase the lift on one side when the aircraft is stalled, by the opening of the slot with a comparatively small accompanying depression of the aileron on the same wing, and to decrease the lift on the opposite side by raising the aileron only and keeping the slot closed. The means now provided in accordance with this invention, is to interconnect the aileron on one wing with the slot control on the other wing. Thus, by raising the aileron and decreasing the lift on the port wing, to open the slot and increase the lift on the starboard wing, and vice-versa. This interconnection is especially suitable in connection with lateral control in which the ailerons are operated differentially. When the aircraft is flying in a normal manner and not stalled, the principal lateral control is obtained from the use of the ailerons in the normal way, and this additional interconnection of the aileron does not aid the control or interfere with it to any practical extent.

In the drawings, Fig. 1 is a plan view of the port and starboard ends of the wings of an aircraft illustrating the connection of a starboard aileron with a port forwardly located aerofoil which is adjustable to and from the leading edge of the port wing. A similar communication is made between the port aileron and the starboard forwardly located aerofoil, but the connecting parts are omitted for the sake of clearness.

Fig. 2 is a section taken on the line X—Y of Fig. 1, and drawn with the parts in the position shown in Fig. 1.

Figs. 3, 4 and 5 are sectional elevations taken on the same line X—Y of Fig. 1, but with the aileron and forwardly located aerofoil in different relation.

Fig. 6 is a plan, and Fig. 7 a sectional elevation on the line $X^1$—$Y^1$ of Fig. 6, showing a means of connection between the ailerons and their connected aerofoils; and Fig. 8 is a detail view of a means for operating the ailerons with a single lever.

Referring particularly to Figs. 1 to 5, A is the starboard aileron, and $A^1$ the port aileron. B is the starboard aerofoil, and $B^1$ the port aerofoil. The aileron A is pivoted at C on a bracket $C^1$, and an arm D on the aileron A transmits forward and aft movements through a rod $D^1$ to a bell crank lever E pivoted at $E^1$ to the frame of the starboard wing. The bell crank lever E is connected by two rods or cables F, $F^1$ to a second bell crank lever G on the pivot $G^1$ on the port wing, in such a way that all movements transmitted from the aileron A to the bell crank lever E are communicated to the bell crank lever G.

H is a connecting rod connecting the bell crank lever G with a rocking part J, and the said rocking part J communicates with an extension $B^2$ of the aerofoil $B^1$ by means of a connecting link K. The extension $B^2$ of the aerofoil $B^1$ is carried on parallel links L, $L^1$, which permit of the aerofoil $B^1$ being given a forward movement approximately parallel with the leading edge of the wing, the movements forward and back to the wing being imparted from the rocking part J by means of the connecting link K.

In the position of the parts shown in Figs. 1 and 2, the aileron A is in the central position and corresponds with the position of the aileron $A^1$, and the aerofoil $B^1$ is held closely against the leading edge of the port wing by reason of the connecting link K being maintained in its rearmost position. In the same way the starboard aerofoil B is also in its rearmost position, the connection (not shown in the drawings) between the port aileron $A^1$ and the starboard aerofoil B being similar to that above described.

In adjusting the ailerons A and $A^1$ for controlling the machine during normal flight, when the movements of the ailerons in opposite directions are comparatively small and are of approximately similar angular adjustment, the connecting rod H is moved forward as in Fig. 3, or rearward as in Fig. 4, as the aileron A is lowered or raised. This movement being imparted to the rocking part J, raises and lowers the after end of the link K, as shown in Figs. 3 and 4, but although the movement up and down of the end of the link K is comparatively large, the fore and aft movement of the forward end of the link K is comparatively small owing to the after end of the link K crossing the dead point of the crank movement of the rocking part J. The aerofoil $B^1$ therefore remains approximately in contact with the leading edge of the wing, and the slot between the aerofoil $B^1$ and the leading edge of the wing remains closed. When, however, the aileron A is moved upwards to a greater angle (see Fig. 5), the rocking part J continuing its angular movement beyond the position where the after end of the link K crosses the dead point, the said link is moved substantially forward, and in advancing it thrusts the aerofoil $B^1$ in a forward direction and opens the slot between the said aerofoil and the leading edge of the wing. The return of the aileron A to any of the positions illustrated in Figs. 2, 3 and 4 closes the slot by bringing the link K back to the region of the dead point of the rocking part J, thus closing the slot.

Where the aileron on one side is raised through a greater angle than the aileron on the other side of the machine is depressed, the connection of the said aileron which is being raised causes the slot in advance of the aileron which is being depressed to the lesser degree to open to a greater extent, than if it were connected to the aileron immediately in advance of it. In the same way, the connection of the aileron which is being depressed to a less degree on one side of the machine by being connected to the slot-operating mechanism on the opposite side of the machine, causes the slot to open but slightly when located in front of the aileron which is being raised to a larger extent.

Thus, the movement upward of the aileron on one side of the machine causes the slot to open on the other side. Similarly, the slight downward movement of the aileron on one side will hardly open the slot at all on the other side. The slot is thus maintained closed for all practical purposes on the wing whose ailerons are raised, while on the other side the slot may be fully opened on the side which has the aileron given the slight downward movement. The necessity for cam or other correcting device connecting the front aerofoil to the rear aileron behind it is therefore avoided.

In the example illustrated in Figs. 6, 7 and 8 the forwardly located aerofoils $B^1$ and B are operated directly from their connected ailerons A and $A^1$ by means of connections $D^1$, E, F, $F^1$, G and H onto an extension $L^2$ of the link $L^1$. This arrangement gives direct operation to the aerofoil $B^1$ from the aileron A, and where it is desired to open one only of the slots and this only when the aileron controlling it is raised, a cam arrangement as shown at Fig. 8 may be employed in which one of the connections such as $F^1$ is provided with a sliding rod $F^2$ having a bowl $F^3$ working in a cam slot M in a cam disc N. A similar cam slot operates similar mechanism to operate the connection between the aileron $A^1$ and the aerofoil B. A handle P permits of the cam discs N being rocked to lift the aileron A or the aileron $A^1$ and permit the aerofoil on the side where the aileron is lifted to remain stationary, thus causing the slot to remain closed on the side where the aileron is lifted, whilst opening on the opposite side.

It is evident that the mechanisms before described do not interfere with any movements which may be imparted to the ailerons, because both ailerons, so far as the mechanisms above described are concerned, are independent of each other. Thus, any known means may be employed for adjusting the ailerons, which may be adjusted in opposite directions simultaneously, or may be adjusted independently of each other, or in different quantity of motion relatively to each other.

What I claim as my invention and desire to secure by Letters Patent is:—

1. Aircraft having port and starboard wings, an aileron on each wing, and means for angularly adjusting such ailerons, each port and starboard wing also having slot openings and slot-operating means to adjustably open or close said slot openings, in combination with means connecting the aileron on said starboard wing with the slot-operating means on said port wing, and means connecting the aileron on said port wing with the slot-operating means on said starboard wing.

2. Aircraft having port and starboard wings, an aileron on each wing, and means for angularly adjusting such ailerons, each port and starboard wing also having slot openings and slot-operating means to adjustably open or close said slot openings, in combination with means connecting the aileron on said starboard wing with a lost motion intermediate part, means connecting said lost motion intermediate part with the slot-operating means on said port wing, and means connecting the aileron on said port wing with a lost motion intermediate part, means connecting said lost motion intermediate part with the slot-operating means on said starboard wing, all adapted to permit said slots on said port and starboard wings to remain closed during the normal flying adjustments of said ailerons but to cause said slots to open when said ailerons to which they are connected are raised abnormally.

3. Aircraft having port and starboard wings, an aileron on each wing, and means for angularly adjusting such ailerons, each port and starboard wing also having slot openings and slot-operating means to adjustably open or close said slot openings, in combination with means connecting the aileron on said starboard wing with the lateral arm of a bell crank lever, means connecting the longitudinal arm of said bell crank lever with the slot-operating means on said port wing, and means connecting the aileron on said port wing with the lateral arm of a bell crank lever, means connecting the longitudinal arm of said bell crank lever with the slot-operating means on said starboard wing, all adapted to permit said slots on said port and starboard wings to remain closed during the normal flying adjustments of said ailerons but to cause said slots to open when said ailerons to which they are connected are raised abnormally.

4. Aircraft having port and starboard wings, an aileron on each wing and means for angularly adjusting such ailerons, each port and starboard wing also having slot openings and slot-operating means to adjustably open or close said slot openings, in combination with means connecting the aileron on said starboard wing with the lateral arm of a bell crank lever, means connecting the longitudinal arm of said bell crank lever with parallel link mechanism carrying an adjustable aerofoil on said port wing, and means connecting the aileron on said port wing with the lateral arm of a bell crank lever, means connecting the longitudinal arm of said bell crank lever with parallel link mechanism carrying an adjustable aerofoil on said starboard wing, all adapted to permit said slots on said port and starboard wings to remain closed during the normal flying adjustments of said ailerons but to cause said slots to open when said ailerons to which they are connected are raised abnormally.

In witness whereof I have hereunto set my hand.

FREDERICK HANDLEY PAGE.